Patented Feb. 27, 1951

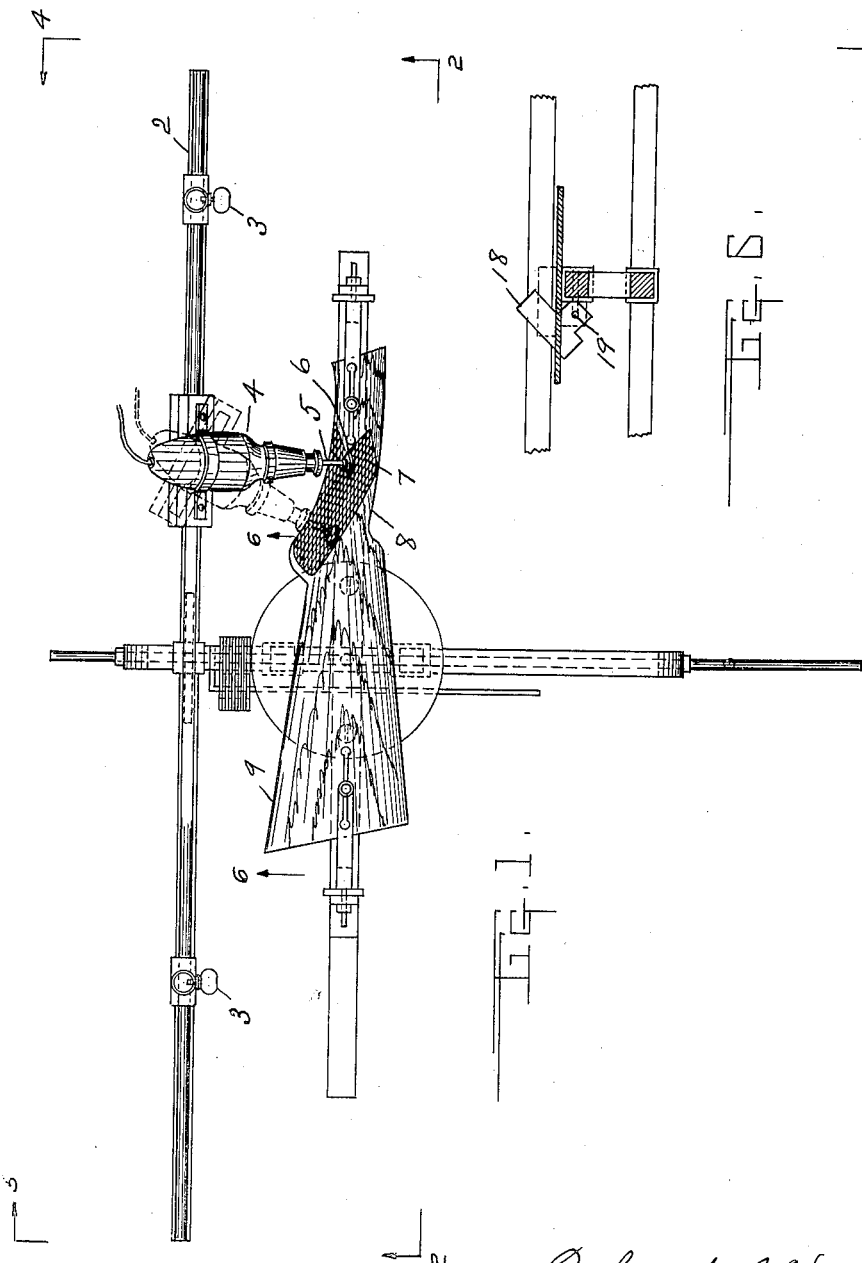

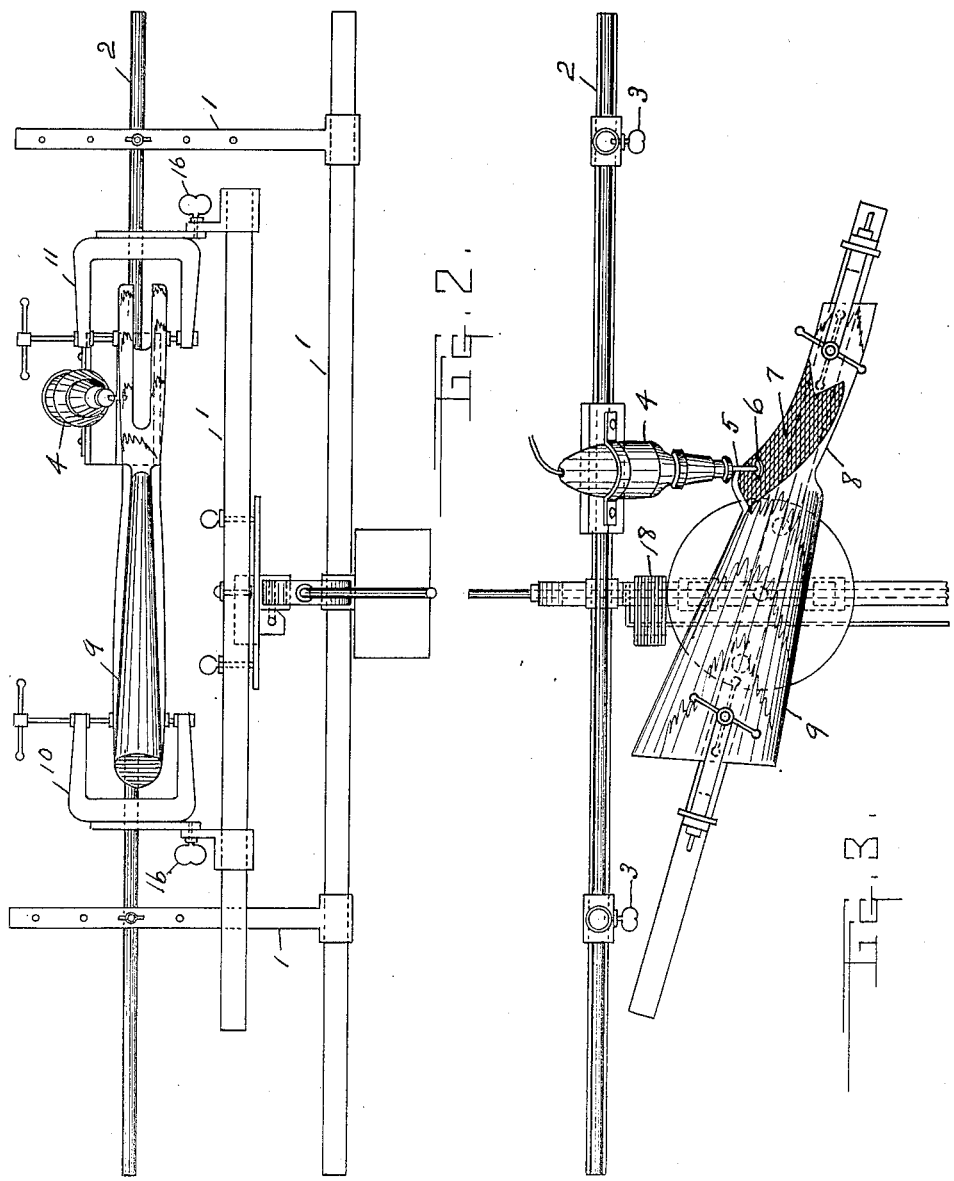

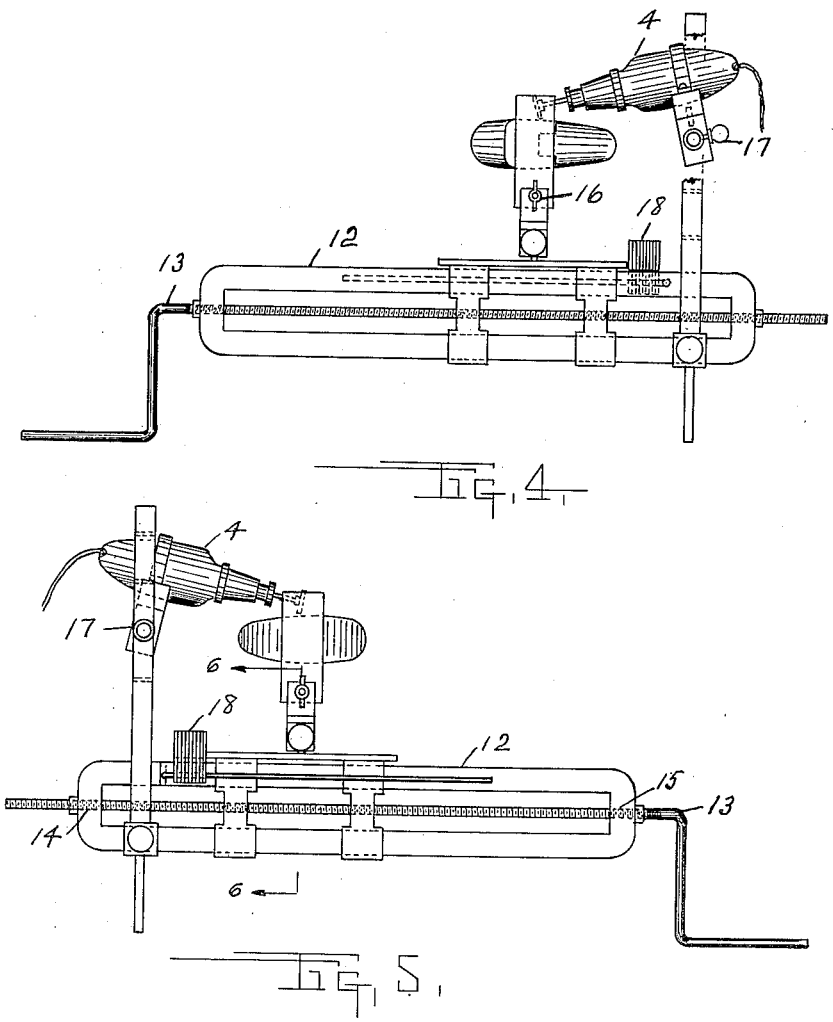

2,543,405

UNITED STATES PATENT OFFICE 2,543,405

POWER-OPERATED WOOD CARVING TOOL

Richard G. Hayes, Trussville, Ala.

Application January 24, 1949, Serial No. 72,479

1 Claim. (Cl. 144—136)

This invention relates to a power operated wood carving tool. It is especially intended for use in carving ornamental designs on the hand gripping portions of gun stocks to make same more attractive and also provide better means for hand gripping. It has for its main objects to provide such a tool that will be highly efficient for its purpose, comparatively cheap to manufacture, simple in structure, and extremely durable.

At the present time such carving on gun stocks is produced manually with several tools used separately. This method is slow, often inaccurate, and requires much time, with the result being very expensive. The present invention is adapted to do accurate and attractive work, and also save considerable labor cost.

Other objects and advantages will appear from the drawings and description.

By referring generally to the drawings, part of this application, it will be observed that Fig. 1 is a plan view of the assembled tool; Fig. 2 is a front elevational view of Fig. 1 on line 2—2; Fig. 3 is a plan view showing part of the tool in a different position compared to Fig. 1; Fig. 4 is an end view of Fig. 1 on line 4—4; Fig. 5 is an end view of Fig. 1 on line 5—5; and Fig. 6 is a fragmentary and detail view substantially on line 6—6 of Fig. 5.

Similar reference numerals refer to similar parts throughout the several views.

Referring to the drawings in detail it will be seen that the assembled tool comprises a supporting frame 1 preferably made of metal rods or pipe with a bar 2 adapted to be held in various positions by thumb screws 3. Mounted slidable on the bar is a small electric motor 4 having attached on the end of its shaft 5 a metal cutting disc 6 that is adapted to cut ornamental or hand gripping grooves 7 in the hand holding portion 8 of a gun stock 9 while held in place for the purpose by clamps 10 and 11. The carriage assembly 12 that supports the stock is slidable by means of the threaded crank shaft 13 operating in companion threaded holes 14 and 15 of the carriage assembly. The gun stock so held may be tilted to different positions and there held by clamping with the wing screw 16. Also the motor may be set in different positions and there held by the wing screw 17. To regulate the distance of the motor supports from the gun stock supporting members a plurality of metal pieces 18 of uniform thickness are mounted swingable on a shaft 19 so that any number of same may be used as spacers to set the cutting disc in the desired position and there be held by setting the threaded crank bar in clamping condition.

The supporting frame may be made in various shapes and sizes providing it is constructed so that the motor cutting disc is set for coacting with the supporting means of the gun stock with proper relation to each other. Also the supporting frame may be made to rest upon an ordinary work bench or be held in a vice for use.

From the foregoing it will appear that with the gun stock set in proper position and held firmly by the clamping means of the assembly, and with the motor operated disc set in proper alignment by its adjusting and clamping means, the disc will be adapted for moving along by manual means to thus cut grooves in the gun stock.

While the device is primarily intended for use on gun stocks, it may also be used to cut ornamental or practical designs in other shapes of wood.

The various parts of the assembled tool may be made of any material suitable for the purpose; also may be made in various sizes and capacities.

While I have shown and described the preferred embodiment of my invention, I do not wish to limit same to the exact and precise details of structure, but reserve the right to make all modifications and changes so long as they remain within the spirit and scope of the invention and the following claim.

Having described my invention I claim:

In a wood cutting tool comprising; an assembled metal frame, said frame being adapted for mounting on a work bench, a metal bar mounted upon one upper side portion of the frame, clamping means adapted to hold said bar in several fixed positions, a bracket mounted slidably and tiltably on said bar, a small electric motor mounted in the bracket on the bar, said motor being adapted for occupying a plurality of positions on the bar and having clamping means for firmly holding it in any one of said positions, a motor shaft extending from the motor, a metal disc mounted on the outer end of the motor shaft, said disc being adapted while being revolved to cut a groove in an object in contact with it; a plurality of clamping means mounted upon the opposite upper side portion of the frame, said last named clamping means being adapted to hold a gun stock in several positions in relation to the disc mounted on the motor shaft, said bracket and motor assembly being adapted for manual movement while said motor is in operation for the disc to make contact with a gun stock held in clamped position near the disc; gauge means for regulating the distance between the disc and the gun stock so held, said gauge means consisting of a plurality of flat metal pieces mounted swingably on a shaft and adapted to be held in position by other clamping means; a threaded shaft with integral crank handle adapted for moving and regulating the position of a gun stock while being clamped in position for cutting by the said disc.

RICHARD G. HAYES.

REFERENCES CITED

The following references are of record in the file of this patent:

UNITED STATES PATENTS

| Number | Name | Date |
|---|---|---|
| 1,895,054 | Steinmeyer | Jan. 24, 1933 |
| 1,958,203 | Pfau | May 8, 1934 |